(12) United States Patent
Persson (10) Patent No.: US 8,788,558 B2
(45) Date of Patent: Jul. 22, 2014

(54) METHOD AND DEVICE FOR TRANSFORM COMPUTATION

(75) Inventor: Per Persson, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1240 days.

(21) Appl. No.: 12/666,547

(22) PCT Filed: Jun. 26, 2008

(86) PCT No.: PCT/EP2008/058218
§ 371 (c)(1),
(2), (4) Date: Jan. 18, 2010

(87) PCT Pub. No.: WO2009/000905
PCT Pub. Date: Dec. 31, 2008

(65) Prior Publication Data
US 2010/0185715 A1    Jul. 22, 2010

(30) Foreign Application Priority Data
Jun. 28, 2007 (SE) ..................................... 07111255

(51) Int. Cl.
*G06F 7/00* (2006.01)
*G06F 17/14* (2006.01)
*G06F 3/00* (2006.01)

(52) U.S. Cl.
USPC ........... 708/409; 708/200; 708/209; 708/400; 708/403; 708/404; 710/52

(58) Field of Classification Search
USPC ................. 708/400, 403–404, 409, 209, 200; 702/182; 710/52
See application file for complete search history.

(56) References Cited

U.S. PATENT DOCUMENTS 3,673,399 A    6/1972    Hancke et al.
3,871,577 A    3/1975    Avellar et al.
(Continued)

FOREIGN PATENT DOCUMENTS

JP    2003-150576    5/2003
WO    2007/127938 A2    11/2007

OTHER PUBLICATIONS

EPO, Search Report in EP07111255, May 9, 2008.
EPO, Int'l Search Report in PCT/EP2008/058218, Oct. 7, 2008.
(Continued)

*Primary Examiner* — Farley Abad
*Assistant Examiner* — Henry Yu
(74) *Attorney, Agent, or Firm* — Patent Portfolio Builders PLLC (57) ABSTRACT

A method of operating a data-processing unit to produce a transform comprises calculating first and second output data values based at least on first and second input data values. The method comprises reading the first and second input data values from locations of a first buffer, the locations being determined by first and second read addresses based on first and second read indices. The method also comprises writing the first and second output data values to adjacent memory locations of a second buffer during a single write cycle. Furthermore, the method comprises reading third and fourth input data values from locations of the second buffer, the locations being determined by third and fourth read addresses determined by swapping at least two of the bits of the first and second read indices respectively. A data-processing unit for producing a transform, a transform-computation unit and an electronic apparatus are also described.

25 Claims, 4 Drawing Sheets

(56) References Cited

U.S. PATENT DOCUMENTS

| | | | |
|---|---|---|---|
| 6,247,034 B1 * | 6/2001 | Nakai et al. | 708/409 |
| 6,275,781 B1 * | 8/2001 | Maness et al. | 702/182 |
| 6,629,117 B2 * | 9/2003 | Aizenberg et al. | 708/404 |
| 6,760,741 B1 * | 7/2004 | Vinitzky | 708/403 |
| 6,904,445 B1 * | 6/2005 | Bacher | 708/400 |
| 6,938,064 B1 * | 8/2005 | Jalali et al. | 708/404 |
| 7,024,442 B2 * | 4/2006 | Yamamoto et al. | 708/404 |
| 7,340,495 B2 * | 3/2008 | Buxton et al. | 708/209 |
| 7,555,511 B2 * | 6/2009 | Steinberg | 708/404 |
| 7,752,249 B2 * | 7/2010 | Yu | 708/404 |
| 8,126,953 B2 * | 2/2012 | Shih | 708/404 |
| 8,549,059 B2 * | 10/2013 | Modlin et al. | 708/404 |
| 2004/0193848 A1 * | 9/2004 | Tavares | 712/224 |
| 2005/0146978 A1 * | 7/2005 | Lee | 365/230.06 |
| 2006/0004900 A1 | 1/2006 | Steinberg | |
| 2006/0200513 A1 * | 9/2006 | Cheon | 708/400 |
| 2007/0288542 A1 * | 12/2007 | Shih | 708/404 |
| 2008/0229177 A1 * | 9/2008 | Kotecha | 714/776 |

OTHER PUBLICATIONS

C-H Sung et al., Design and Implementation of a Scalable Fast Fourier Transform Core, Proc. 2002 IEEE Asia-Pacific Conference on ASICS, Aug. 6-8, 2002, pp. 295-298, Taipei, Taiwan.

J.K. Tanskanen et al. On Design of Parallel Memory Access Schemes for Video Coding, J.VLSI Signal Processing, Jun. 1, 2005, pp. 215-237, vol. 40, No. 2.

Japan Patent Office, Office Action, in JP 2010-513926, Jan. 8, 2013.

* cited by examiner

METHOD AND DEVICE FOR TRANSFORM COMPUTATION

TECHNICAL FIELD

The present invention relates to the field of digital data processors, and in particular to the computation of transforms in digital data processors.

BACKGROUND

Various transforms are used in a large variety of data processing applications, such as digital signal processing of received signals in devices compliant with radio access standards using Orthogonal Frequency Division Modulation (OFDM), for example UMTS LTE (Universal Mobile Telecommunications System Long Term Evolution). Various trans-forms may also be used, for example, in signal analysis, compression algorithms, and filtering. Furthermore, transforms may be applicable for use in devices compliant to other standards than UMTS LTE, such as UMTS (Universal Mobile Telecommunications), GSM (Global System for Mobile communications), GPRS (General Packet Radio Service), and DVB (Digital Video Broadcasting). Computing a transform may be a relatively computationally complex data processing task, and therefore it is often crucial to the overall processing performance that the transform computation is optimized as far as possible.

It is well known in the art that it is possible to reduce a size-N transform, e.g. a Fourier transform, to $\log_2 N$ calculation stages, each comprising N/2 size-2 transforms if N is a power of 2. This rearrangement of the computations reduces the order of the problem from $N^2$ to $N\log_2 N$. In the case of the Fourier transform, the resulting computation method is denoted the fast Fourier trans-form (FFT).

A transform is often represented as a so-called butterfly diagram. An example butterfly diagram will be described later on in connection to FIG. 2A. A butterfly diagram comprises a plurality of computation kernels. An example of such a computation kernel 100 is given in FIG. 1. In the figure, it may be seen that a computation kernel can be drawn such that it resembles a butterfly.

Figure 1:
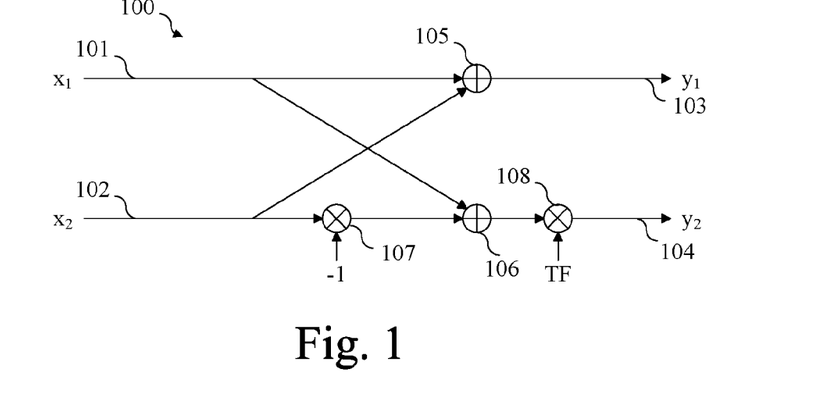
FIG. 1 is a diagram that illustrates an example computation kernel.

The two pieces of input data to the butterfly calculation performed in the computation kernel 100 are denoted $x_1$ and $x_2$ and are supplied at inputs 101 and 102, respectively. The two pieces of output data from the butterfly calculation are denoted $y_1$ and $y_2$ and may be found at the outputs 103 and 104, respectively. The output data value at output 103 of this example butterfly computation is attained by adding, in adder 105, the input data value at input 101 to the input data value at input 102. The output data value at output 104 is attained by changing the sign of the input data value at input 102 in multiplier 107, adding, in adder 106, the input data value at input 101 to the result of multiplier 107, and multiplying, in multiplier 108, the result of adder 106 by a so called twiddle factor (TF).

It is emphasized that the realization of the computation kernel shown in FIG. 1 merely represents one example among many possible various realizations. As an example variation, the multiplications may be performed by other means than multipliers. The multiplications may be performed according to any method presently known, such as by shift and add operations, or according to any method for multiplication that will be discovered in the future.

Figure 2A:
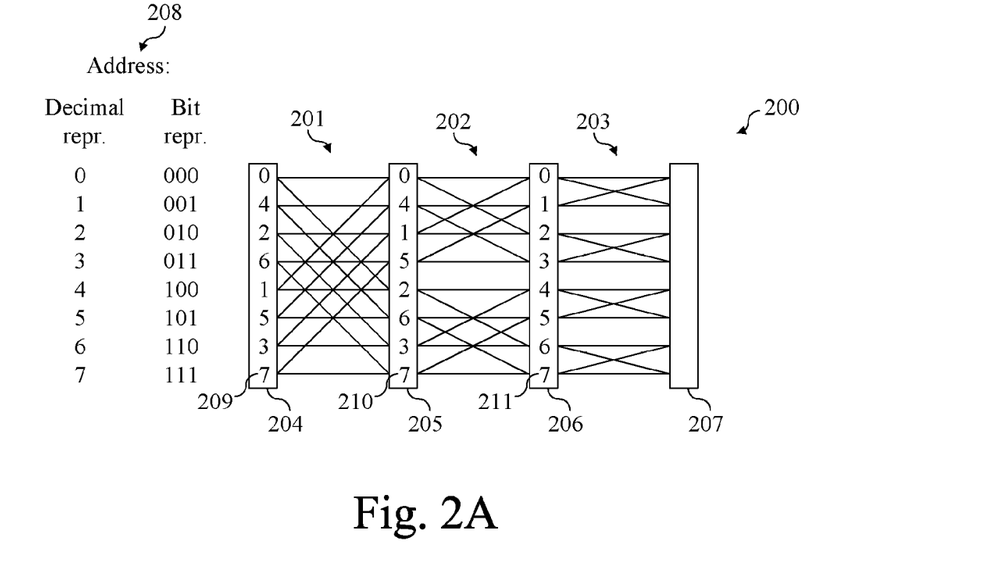
FIG. 2A is a butterfly diagram that illustrates an example implementation of a size-8 FFT-computation.

An entire transform computation is made up of $(N/2)\log_2 N$ such butterflies, and this is exemplified in FIG. 2A, where a size-8 FFT-computation 200 is shown. The depiction of the butterflies has been simplified in FIG. 2A, so that the figure will not be too cluttered. It should be understood, however, that the adders and multipliers, for example as shown in FIG. 1, are also present in the implementation of FIG. 2A.

It is to be noted that, in FIG. 2A, there are 3 (=$\log_2 8$) computation stages 201, 202, 203, which each consists of 4 (=8/2) butterfly calculations. Hence, the execution of a transform computation may be represented as a nested loop with $\log_2 N$ iterations of an outer loop (one iteration per transform stage) and N/2 iterations of an inner loop (one iteration per butterfly calculation). The execution of a transform computation may alternatively be represented as a single loop with $\log_2 N$ iterations (one iteration per transform stage) and the N/2 butterfly calculations being computed in parallel. In FIG. 2A, the intermediate results of the transform computation are stored in buffers 204, 205, 206 and the final result of the transform computation is stored in buffer 207. Some implementations use two buffers altogether to fulfill this task. The two buffers alternate, through the different stages of the transform computation, in serving as read buffer and write buffer. Yet some implementations, so-called in-place transforms, use only a single buffer. The addresses 208 of the different locations in the buffers 204, 205, 206, 207 are given in both decimal representation and bit representation for clarity. Also shown in FIG. 2A, are exemplary read indices 209, 210, 211 that are used to determine which buffer address to read from during each read cycle. For example, according to the indices and addresses given in FIG. 2A, the first butterfly calculation (corresponding to the read indices 209 with values 0 and 1) of the first stage should use input data from buffer addresses 0 and 4 (and write the result of the butterfly calculation to addresses 0 and 4 of the output buffer), and the second butterfly calculation (corresponding to the read indices 209 with values 2 and 3) of the first stage should use input data from buffer addresses 2 and 6. To further exemplify, the first butterfly calculation (corresponding to the read indices 210 with values 0 and 1) of the second stage should, according to FIG. 2A, use input data from buffer addresses 0 and 2, and the second butterfly calculation (corresponding to the read indices 210 with values 2 and 3) of the second stage should use input data from buffer addresses 4 and 6.

It is well known in the art that the input of the transform computation such as the one shown in FIG. 2A should be read in bit-reversed order from the input buffer 204. It can be seen in the figure that the bit representation of the read indices 209 of the first stage if reversed corresponds to the bit representation of the buffer addresses 208. Several variations exist. For example, the input of the transform computation may be read in natural order from the input buffer 204. This however, would result in an implementation that is different from the one shown in FIG. 2A.

One problem with existing solutions for transform computation is time consumption. For example, for each butterfly computation, two read accesses are required to fetch two pieces of input data, and two write accesses are required to store the result, i.e. two pieces of output data. This generally requires at least four cycles for each butterfly computation. Since the dimensions of a transform may be quite large (N in the order of 1024-8192 is common), each transform computation involves a large amount of butterfly calculations. Hence, even though the execution of the butterfly calculations are often pipelined, the execution time of each butterfly calculation is crucial to the overall computation time of a transform.

Some implementations use buffers that can handle two read and/or two write accesses in a single cycle, e.g. buffers that comprise two or more address inputs, so-called two-port or dual-port memories. Even though this may reduce the overall computation time, these types of buffers are generally more expensive than buffers with only one address input, and therefore such a solution is not always preferable.

Other implementations may separate each buffer into two or more memory banks, which also enables two read and/or two write accesses in a single cycle. Such solutions generally result in increased complexity compared to solutions where the buffers are not separated into memory banks.

Thus, there is a need for data-processing implementations and methods of transform computations that reduce the overall computation time. This should preferably be achieved without increasing the implementation cost and complexity at all or to a moderate increase in implementation cost and/or complexity.

SUMMARY

It is an object of the invention to obviate at least some of the above disadvantages and to provide improved methods and processors for transform computation.

According to a first aspect of the invention, this is achieved by a method of operating a data-processing unit to produce a transform. The method comprises reading a first input data value from a location of a first buffer, the location being determined by a first read address based on a first read index, and reading a second input data value from a location of the first buffer, the location being determined by a second read address based on a second read index. The method comprises calculating first and second output data values based on at least the first and second input data values, and writing said first and second output data values to a second buffer. The first and second output data values are written to adjacent memory locations of the second buffer during a single write cycle, where the adjacent locations are determined by a first write address. The method comprises reading a third input data value from a location of the second buffer, the location being determined by a third read address based on the first read index, and reading a fourth input data value from a location of the second buffer, the location being determined by a fourth address based on the second read index. The third read address is determined by swapping at least two of the bits of the first read index, and the fourth read address is determined by swapping at least two of the bits of the second read index. The data-processing unit performs these method steps. The data-processing unit may comprise one or more physical elements.

In some embodiments according to the first aspect of the invention the third read address is determined by swapping two of the bits of the first read index, and the fourth read address is determined by swapping two of the bits of the second read index. The first read address may be determined by reversing the bit order of the first read index and the second read address is determined by reversing the bit order of the second read index.

The first and second output data values may be further based on at least one twiddle factor. A method according to the first aspect of the invention may further comprise reading the at least one twiddle factor from a location of a third buffer.

The method according to the first aspect of the invention may comprise calculating third and fourth output data values based on at least the third and fourth input data values, and writing said third and fourth output data values to adjacent memory locations of the first buffer during a single write cycle.

The transform may be a size-N transform, and the steps of reading the first and second input data values, calculating the first and second output data values, and writing the first and second output data values to adjacent memory locations of the second buffer during a single write cycle may be performed N/2 times during a first stage of the transform. The steps of reading the third and fourth input data values, calculating the third and fourth output data values, and writing the third and fourth output data values to adjacent memory locations of the first buffer during a single write cycle may be performed N/2 times during a second stage of the transform. The steps of reading two input data values, calculating two output data values, and writing the two output data values to adjacent memory locations of a buffer during a single write cycle may be performed N/2 times during each stage of the transform.

The transform may be a fast Fourier transform. Furthermore, the first and second read indices may comprise address values of at least one of the first and second data buffers.

According to a second aspect of the invention, a data-processing unit for producing a transform comprises an address generator and circuitry adapted to read a first input data value from a location of a first buffer for storing data values, the location being determined by a first read address based on a first read index and to read a second input data value from a location of the first buffer, the location being determined by a second read address based on a second read index. The circuitry is adapted to calculate first and second output data values based on at least the first and second input data values and to write said first and second output data values to adjacent memory locations of a second buffer for storing data values during a single write cycle, where the adjacent locations are determined by a first write address. The circuitry is also adapted to read a third input data value from a location of the second buffer, the location being determined by a third read address based on the first read index, and to read a fourth input data value from a location of the second buffer, the location being determined by a fourth address based on the second read index. The address generator is adapted to determine the third read address by swapping at least two of the bits of the first read index, and to determine the fourth read address by swapping at least two of the bits of the second read index.

According to some embodiments of the second aspect of the invention, the data-processing unit may further comprise at least one register unit adapted to temporarily store at least one of the first input data value, the second input data value, the first output data value, the second output data value, intermediate results of the calculation of the first and second output data values.

The address generator may comprise an input port adapted to receive a control signal, and the address generator may be adapted to swap at least two of the bits of the first read index, and at least two of the bits of the second read index based on the control signal.

Furthermore, the data-processing unit according to the second aspect may have functional features corresponding to the various features of embodiments according to the first aspect.

According to a third aspect of the invention, a transform-computation unit comprises a data-processing unit according to the second aspect of the invention.

According to a fourth aspect of the invention, an electronic apparatus comprises at least one of a dataprocessing unit according to the second aspect of the invention or a transform-computation unit according to the third aspect of the invention. The electronic apparatus may be a portable or handheld mobile radio communication equipment, a mobile radio terminal, a mobile telephone, a pager, a communicator, an electronic organizer, a smartphone, a computer, an embedded drive, a mobile gaming device, a watch, a base station, or a base station controller, and may be compliant with the Universal Mobile Telecommunications System Long Term Evolution standard.

Further embodiments of the invention are defined in the dependent claims.

One of the advantages of the invention is that it may reduce the number of write cycles required to perform a transform computation. More precisely, it may halve the number of write cycles required to perform a transform computation. The advantages of the invention may be achieved at little or no increase in implementation cost and/or complexity, where implementation cost may refer to additional hardware and/or power consumption due to additional computational load.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of the invention will appear from the following detailed description of the invention, with reference being made to the accompavying drawings, in which.

DETAILED DESCRIPTION

Throughout the description, different embodiments for transform computation will be described with some focus on fast Fourier transform computation. It is emphasized, however, that the invention is equally applicable numerous other transform types. For example, the invention is applicable to all transforms, which may be expressed through butterfly diagrams. Examples of such transforms are, in addition to the FFT, a Discrete Cosine Transform (DCT), a Discrete Sine Transform (DST), and their respective inverse transforms.

In the following, embodiments of the invention will be presented, in which the two pieces of output data from a butterfly calculation are written to a buffer during a single write cycle. If a standard memory which comprises a single address input, a so-called single-port memory, is considered to be used as the buffer, writing the two pieces of output data during a single write cycle may be accomplished by writing the two pieces of output data to adjacent memory locations in the buffer according to some embodiments of the invention.

Figure 2B:
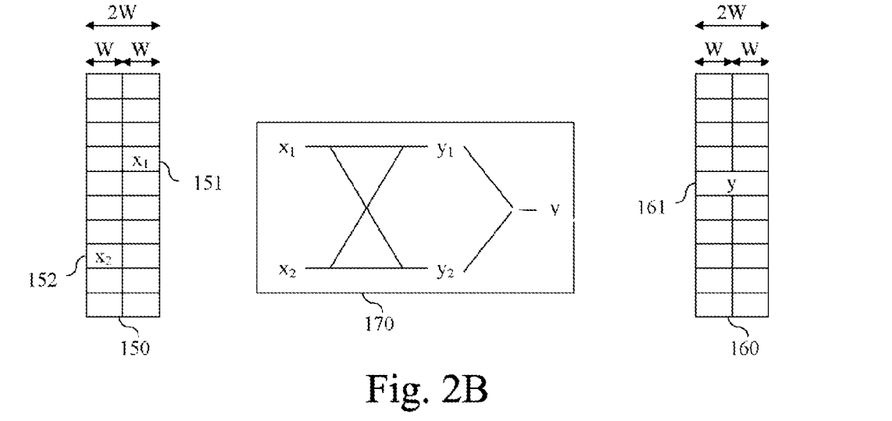
FIG. 2B is a diagram that illustrates example read and write operations according to some embodiments of the invention.

This is illustrated in FIG. 2B. As explained in connection to FIG. 1, a butterfly calculation unit 170 produces two pieces of output data ($y_1$ and $y_2$) from two pieces of input data ($x_1$ and $x_2$). As before, the depiction of the butterfly has been simplified so that the figure will not be too cluttered. The pieces of data ($x_1$, $x_2$, $y_1$ and $y_2$) all have a certain word length (W).

Hence, in embodiments of the invention each of the pieces of data may have word length W, and a memory cell (comprising two adjacent memory locations) of a buffer may be twice as wide as the data, that is, 2 W. Hence, a memory cell may be capable of storing two pieces of data. Furthermore, the buffer may have means to select one of the two adjacent memory locations (that is, one of the two pieces of data) in a memory cell. This capability may, for example, be used during read operation.

The functionality may be accomplished, in some embodiments, by discarding some of the least significant bits when addressing the buffer. For example, if an addressing scheme is given in which each address points out a memory location of width W and bit 0 is discarded when addressing the buffer, a reference to a memory cell of width 2 W (capable of storing two pieces of data, each of word length W) results. A particular one of the two memory locations comprised in a memory cell may be addressed by selecting the lower half of the memory cell when address bit 0 is zero and selecting the upper half of the memory cell when address bit 0 is one.

The butterfly calculation unit 170 may read the two pieces of input data from a buffer 150. The buffer 150 may be divided into several buffer locations, each being able to store data of word length W, and each having a certain position within the buffer as defined by an address. As explained previously, two adjacent buffer locations may be contained in a buffer cell of word length 2 W, and the position of each cell within the buffer may be defined by discarding bit 0 in the address. In read operation, the correct piece of data is obtained by selecting the lower half of the 2 W data bits read from the buffer when address bit 0 is zero and selecting the upper half of the 2 W data bits read from the buffer when address bit 0 is one. In the example of FIG. 2B, the calculation unit 170 reads the two pieces of input data from buffer locations 151 and 152.

When the butterfly calculation unit 170 has calculated the two pieces of output data, each having word length W, these two pieces of data are concatenated to produce one piece of concatenated output data (y) having word length 2 W. The concatenation may be performed by the butterfly calculation unit 170 as indicated in the figure. It is to be noted that the concatenation may be realized as a "no-op" (short for no operation) in hardware, since placing the bits of $y_1$ and $y_2$ adjacent to each other may be implemented as pure wiring.

The concatenated output data y is then written to a buffer 160. The buffer 160 may be divided into several buffer locations and corresponding buffer cells similarly to buffer 150. Each buffer location may be able to store data of word length W, and have a certain position within the buffer as defined by an address. Each buffer cell may be able to store data of word length 2 W, and have a certain position within the buffer as defined by discarding bit 0 of the address. To store the concatenated output data y in the buffer requires an entire buffer cell of length 2 W, since y has a word length of 2 W. In write operation, bit 0 in the write address is discarded as explained above. Since the two pieces of data have been concatenated, they will be written to the two adjacent buffer locations comprised in the buffer cell that is pointed out by the reference resuiting from discarding bit 0 in the address. Hence, writing y to the buffer 160 is equivalent to writing the two pieces of output data to adjacent memory locations, and since only a single buffer address is required to indicate where the data should be written, only a single write cycle is required. In the example of FIG. 2B, the concatenated output data is written to buffer locations 161.

Hence, it is possible to write the two pieces of output data in a single write cycle, for example by concatenating the two pieces of output data and using a single write address. This solution is cheaper than using a twoport memory, less complex than using buffers separated into memory banks, and requires the same amount of write cycles.

Hence, using the solution above, the intermediate results cannot be written in the order as shown for the example size-8 FFT in FIG. 2A for the majority of the butterfly calculations that constitute a transform computation. Instead, as a result of writing the two pieces of output data to adjacent memory locations, a "skewed" butterfly structure emerges. This is exemplified in FIG. 2C, where a size-8 FFT-computation 200' according to some embodiments of the invention is shown. 2C In FIG. 2C the buffers 204, 205, 206, 207, the buffer addresses 208 and the computation stages 201, 202, 203 are similar to those of FIG. 2A and hence, denoted with the same reference numerals. As in FIG. 2A, the intermediate results of the FFT-computation are stored in buffers 204, 205, 206 and the final result of the FFT-computation is stored in buffer 207 in FIG. 2C. As described before, some implementations use two alternating buffers altogether to fulfil this task.

Figure 2C:
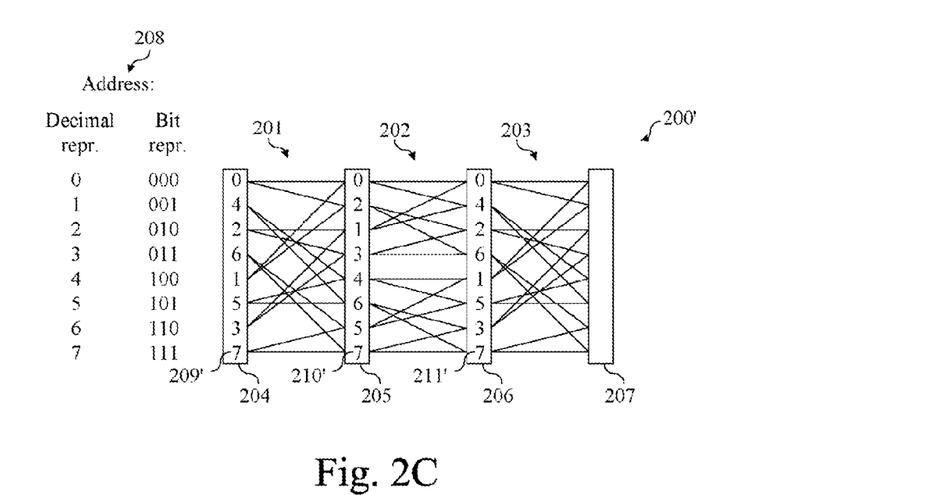
FIG. 2C is a butterfly diagram that illustrates an example implementation of a size-8 FFT-computation according to some embodiments of the invention.

Also shown in FIG. 2C, are the read indices 209', 210', 211' that are used to determine which buffer address to read from during each read cycle, when practicing this embodiment of the invention. It is vital to note in FIG. 2C, that the intermediate results are not stored in the same positions as in FIG. 2A. This means that, after the first stage, the data to be used in each of the butterfly calculations must be read from a different buffer location compared to FIG. 2A.

To exemplify, according to the indices and addresses given in FIG. 2C, the first butterfly calculation (corresponding to the read indices 209' with values 0 and 1) of the first stage should use input data from buffer addresses 0 and 4 (and write the result of the butterfly calculation to addresses 0 and 1 of the output buffer), and the second butterfly calculation (corresponding to the read indices 209' with values 2 and 3) of the first stage should use input data from buffer addresses 2 and 6 (and write the result to addresses 2 and 3 of the output buffer). The first butterfly calculation (corresponding to the read indices 210' with values 0 and 1) of the second stage should, according to FIG. 2C, use input data from buffer addresses 0 and 2, and the second butterfly calculation (corresponding to the read indices 210' with values 2 and 3) of the second stage should use input data from buffer addresses 1 and 3.

In fact, it may be noted by studying the bit representation of the buffer addresses 208 and the read indices 210' in FIG. 2C, that, in stage 2, the read address 208 of a buffer location may be found by swapping bits 0 and 1 of the read index 210'. Furthermore, it may be noted that, in stage 3, the read address 208 of a buffer location may be found by swapping bits 0 and 2 of the read index 211'. This is a general observation that is valid for any size-N transform. Thus, in stage M+1, the read address of a buffer location may be found by swapping bits 0 and M, M=1, 2, . . . , $(\log_2 N)-1$, of the read index.

Figure 2D:
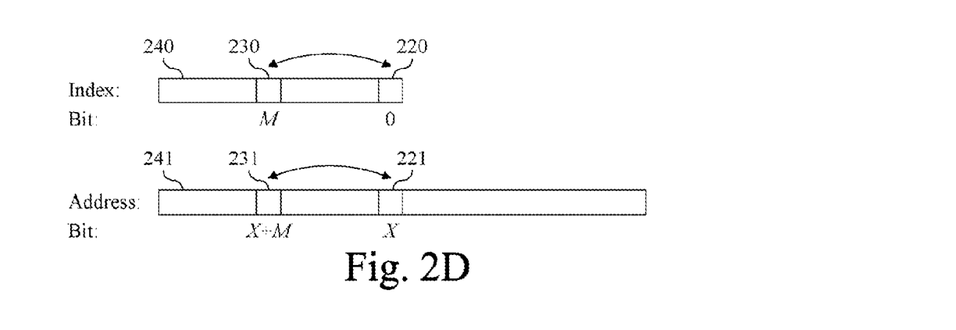
FIG. 2D is a diagram that illustrates an example of bit-swapping in an index according to some embodiments of the invention.

In FIG. 2D, an example of swapping bit 0 (220) and bit M (230) in an index 240 is illustrated. As will be explained later in connection to FIG. 3, an address is then generated based on the bit-swapped index. In some embodiments, the index value is an actual address pointing to a memory location of a buffer.

Also illustrated in FIG. 2D is an example of swapping bit X (221) and bit X+M (231) in an address 241. This illustrates the operation according to some embodiments of the invention. In these embodiments, the index value is an actual address to a memory cell (comprising, for example, two memory locations) of a buffer. As explained in connection to FIG. 2B, one or more of the least significant bits may be used in these embodiments to select one of the two adjacent memory locations in a memory cell. Therefore, these bits are not included in the bit-swapping of the lower example in FIG. 2D. Instead, bits 0, . . . , X−1 are reserved for selecting location within the memory cell, and bits X and X+M are swapped to generate the correct read address.

Referring again to FIG. 2C, the read addresses in the first stage are found (as before) by reversing the bit order of the read index 209' and generating address values based on the bit-reversed index 209'. The bit-reversed index may in itself be an address to a memory location or a memory cell, similarly to what was explained above in convection to the bit-swapped index.

It is should also be noted that the ordering in the output buffer (207) of the pieces of data that constitute the result of the complete transform computation when practicing the invention in general may differ from the ordering that would result from a conventional transform computation. This is not a concern if the subsequent processing is flexible and may be adjusted to fit the different ordering of the result. If, on the other hand, the subsequent processing is fixed and may not be adjusted to fit the different ordering of the result, it may be necessary to add an additional re-ordering stage after the transform computation and prior to the subsequent processing. The implementation cost of such a re-ordering stage is often negligible compared to the advantages gained when practicing the invention.

Figure 3:
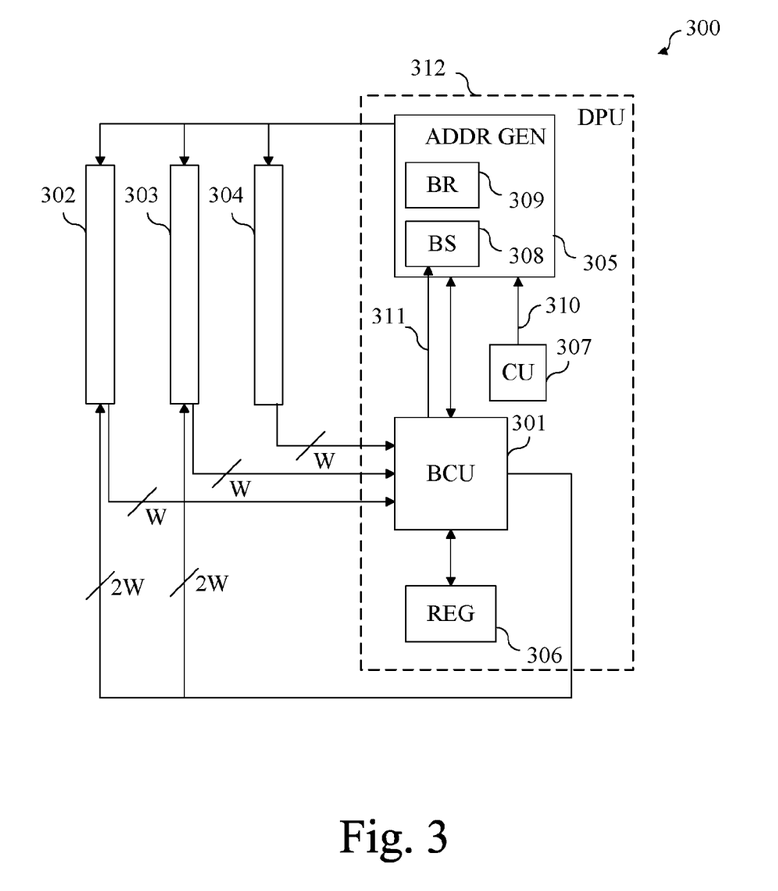
FIG. 3 is a block diagram that illustrates a dataprocessing unit for computing a transform according to some embodiments of the invention.

FIG. 3 illustrates an example transform computation unit 300 comprising a data-processing unit (DPU) 312 according to some embodiments of the invention. The data-processing unit 312 may, for example, be embodied as or included within a digital signal processor (DSP), a central processing unit (CPU), a co-processor unit, a graphics processing unit (GPU), an accelerator, or an application-specific integrated circuit (ASIC). The data-processing unit 312 comprises a butterfly calculation unit (BCU) 301, which is adapted to perform butterfly calculations. Butterfly calculations per se are well known in the art, and the calculations performed by the butterfly calculation unit may be according to any method presently known or according to any method for butterfly calculations that will be discovered in the future. The butterfly calculation unit 301 is operatively connected to first and second data buffers 302, 303. The data buffers 302, 303 may be read/write memories. In this embodiment, the butterfly calculation unit 301 is also operatively connected to a third data buffer 304. The data buffer 304 may be a read-only memory. It should be noted that the third data buffer may be excluded in some embodiments of the invention. The data buffers 302, 303, 304 may be external to the data-processing unit 312, or, alternatively, they may be an integral part of the data-processing unit 312. The two or more data buffers may or may not be part of the same memory unit. The data-processing unit 312 also comprises an address generator (ADDR GEN) 305, and may further comprise one or more register units (REG) 306, and a control unit (CU) 307. The address generator 305 is operatively connected to the butterfly calculation unit 301, and to the buffers 302, 303, 304. The one or more register units 306 may be operatively connected to the butterfly calculation unit 301. The control unit 307 may be operatively connected, for example, to the address generator 305.

The butterfly calculation unit 301 is adapted to read data from the first and second data buffers 302, 303. As an example, the butterfly calculation unit 301 may read two pieces of input data from the first data buffer 302 in first and second read cycles, respectively. These pieces of data may correspond to the input data values at inputs 101 and 102 of the butterfly calculation illustrated in FIG. 1. If the butterfly calculation involves a twiddle factor, this twiddle factor may be read by the butterfly calculation unit 301 from data buffer 304, in parallel to reading from the first data buffer 302, during the first or second read cycle. The twiddle factor may also be read by the butterfly calculation unit 301 during a third read cycle. Alternatively, the twiddle factor may already be stored, for example, in the one or more register units 306. The pieces of input data and the twiddle factor may be of word length W as indicated in FIG. 3.

The butterfly calculation unit 301 is further adapted to calculate two pieces of output data based on at least the two pieces of input data. These pieces of output data may correspond to the output data values at outputs 103 and 104 of the butterfly calculation illustrated in FIG. 1. During the calculation of the two pieces of output data, intermediate results and/or one or more of the two pieces of output data may be temporarily stored in the one or more register units 306. When the calculation of the two pieces of output data is complete, the two pieces of output data are written, during a single write cycle, by the butterfly calculation unit to adjacent memory locations in the second data buffer 303. Writing the two pieces of output data during a single write cycle is accomplished by concatenating the two pieces of output data, for example, in the butterfly calculation unit 301. Thus, the output data written to buffer 303 may be of word length 2 W as indicated in FIG. 3. As noted before, the concatenation may be realized as pure wiring in hardware.

This process continues until all butterfly calculations of a stage of the transform computation are completed. Then, the butterfly calculations of the next stage are executed in a similar manner. However, now the butterfly calculation unit 301 reads the two pieces of input data from the second data buffer 303 and writes the two pieces of output data to the first data buffer 302.

The address generator 305 is adapted to generate read addresses for reading a first and a second piece of input data from one of the data buffers 302, 303. The generation of an address may be initiated, for example, by the control unit 307. Alternatively, the generation of an address may be initiated by the butterfly calculation unit 301, or the address generator may, for example, be adapted to generate an address during each clock cycle and the generation need not be initiated by active action by a unit external to the address generator.

In any case, the address generator is adapted to use an index value to produce a bit-swapped index value. The index value may, for example, be supplied to the address generator by the control unit 307 or by the butterfly calculation unit 301. The address generator 305 is further furnished with a control signal that indicates the bit-swap mode. The bit-swap mode defines which bits should be swapped in the index value to produce the bit-swapped index value. This control signal may be supplied by the control unit 307 through connection 310, or by the butterfly calculation unit 301 through connection 311. The control signal may be activated before a new stage of the transform computation is entered to configure the bit-swap mode of the address generation. The control signal and the index value may be supplied to a bit-swapper (BS) 308, which may, for example, be integral to the address generator 305. The bitswapper 308 may produce the bit-swapped index by swapping bits in the index value as indicated by the control signal.

The address generator 305 then generates an address based on the bit-swapped index. The bit-swapped index value may in itself be an address of one of the memory locations or of one of the memory cells of one of the data buffers 302, 303 as explained above. In this case, the address generator 305 simply outputs the bit-swapped index as the generated address.

The generated address is used to address the buffers 302 and 303, and the butterfly calculation unit 301 reads a data value from a memory location of one of the buffers as indicated by the generated address.

The address generator is further adapted to produce a bit-reversed index value. To this end, the index value may be supplied to a bit-reverser (BR) 309, which may, for example, be integral to the address generator 305. The bit-reverser 309 may produce the bit-reversed index by reversing the bits in the index value.

The address generator 305 then generates an address based on the bit-reversed index. The bit-reversed index value may in itself be an address of one of the memory locations of one of the data buffers 302, 303, 304. In this case, the address generator 305 simply outputs the bit-reversed index as the generated address.

The generated address is used to address the buffers 302, 303, 304, and the butterfly calculation unit 301 reads a data value from a memory location of one of the buffers as indicated by the generated address. In the first stage of the transform computation, the butterfly calculation unit 301 reads input data values from memory locations of one of the buffers 302, 303 as indicated by the address based on the bit-reversed index.

It is noted that the bit-swapper and the bit-reverser may alternatively be realized as one unit.

The address generator 305 may be further adapted to generate write addresses for writing the concatenated two pieces of output data to one of the data buffers 302, 303.

Figure 4:
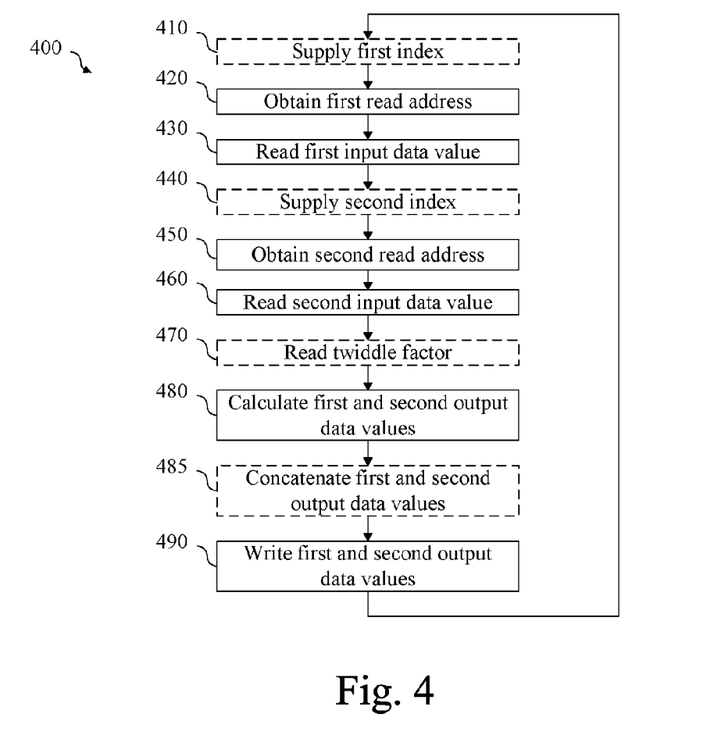
FIG. 4 is a flow chart illustrating a method performed by a butterfly computation unit according to some embodiments of the invention.

In FIG. 4, a method 400 for transform computation is illustrated in a flow chart. The method 400 may, for example, be performed by the butterfly calculation unit of a data-processing unit as the one of FIG. 3.

The method begins in step 410, where a first index value is supplied to an address generation unit, which may be similar or identical to the address generator 305 of FIG. 3. As touched upon before, this step is omitted in some implementations, for example if the index value is supplied by a control unit or is generated within the address generation unit itself.

In step 420, a first read address is obtained, for example, from the address generation unit, and in step 430 a first input data value is read from the memory location of a data buffer as indicated by the first read address.

The method continues to step 440, where a second index value is supplied to the address generation unit. As before, this step is omitted in some implementations. In step 450, a second read address is obtained, and in step 460 a second input data value is read from the memory location of a data buffer as indicated by the second read address.

Then, in some embodiments of the invention, one or more twiddle factors may be read in step 470 from a data buffer, which may be identical to or different from the data buffer accessed in steps 430 and 460. It is understood that this step may alternatively be performed simultaneously to either step 430 or step 460.

The butterfly calculation is performed in step 480. The two resulting output data values are concatenated in step 485, and written to adjacent memory locations of a data buffer during one write cycle in step 490. Again, it is noted that the concatenation may be realized as pure wiring in hardware, and is therefore indicated as a dashed box in the flow chart of FIG. 4.

Figure 5:
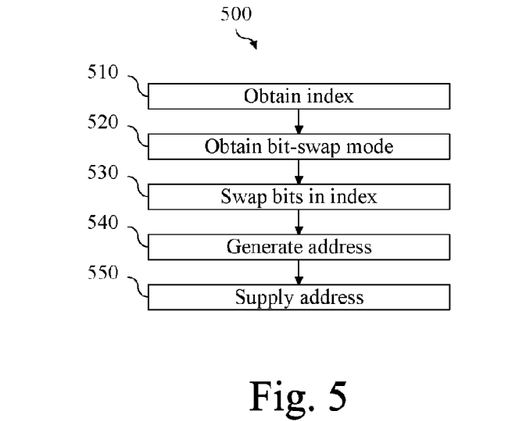
FIG. 5 is a flow chart illustrating a method performed by an address generator according to some embodiments of the invention.

In FIG. 5, a method 500 for read address generation is illustrated in a flow chart. The method 500 may, for example, be performed by the address generator of a data-processing unit as the one of FIG. 3.

The method begins in step 510, where an index value is obtained, and continues in step 520 where a bit-swap mode is obtained. In step 530, a bit-swapped index is generated based on the index value and the bit-swap mode. For example, bits may be swapped as illustrated in FIG. 2D if the bit-swap mode is M, which indicates that the transform computation is performing stage M+1. In step 540, an address is generated based on the bit-swapped index, and in step 550, the generated address is output by the address generator.

The described embodiments of the invention and their equivalents may be performed in part or fully by general-purpose circuits such as a digital signal processor (DSP), a central processing unit (CPU), a co-processor unit, a graphics processing unit (GPU), an accelerator, or by specialized circuits such as for example application specific integrated circuits (ASICs). All such forms are contemplated to be within the scope of the invention. The invention may be embodied as an electronic apparatus comprising one or more data-processing units according to any of the described embodiments. The electronic apparatus may be, for example, a portable or hand-held mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station or a base station controller in a telecommunication system.

Figure 6:
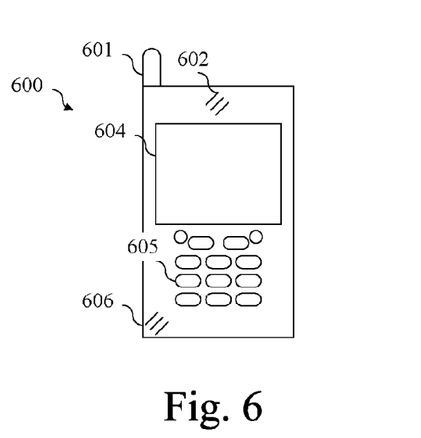
FIG. 6 is a schematic front view of a mobile terminal, which may contain one or more transform computation units according to embodiments of the invention.

FIG. 6 illustrates a mobile telephone 600 as an example electronic apparatus that comprises at least one transform computation unit 300 as described above. The mobile telephone 600 is illustrated in a schematic front view. This example mobile telephone 600 comprises an antenna 601 mounted on the housing of the apparatus. Alternatively, the mobile telephone 600 may have an internal antenna mounted within the housing of the apparatus. The mobile telephone 600 may further comprise a display 604, a keypad 605, a loudspeaker 602, and a microphone 606, which together provides a man-machine interface for operating the mobile telephone 600.

The mobile telephone 600 is adapted to connect to a mobile telecommunication network via a wireless link to a radio station (base station). Hence, a user of the mobile telephone 600 may use conventional circuit-switched telecommunication services such as voice calls, data calls, video calls, and fax transmissions, as well as packet-based services such as electronic messaging, Internet browsing, electronic commerce, etc. To this end, the mobile telephone is compliant with a mobile telecommunication standard, for instance GSM (Global System for Mobile communications), GPRS (General Packet Radio Service), EDGE (Enhanced Data rates for GSM Evolution), UMTS (Universal Mobile Telecommunications System), or UMTS LTE (UMTS Long Term Evolution).

The invention has been described herein with reference to various embodiments. However, a person skilled in the art would recognize numerous variations to the described embodiments that would still fall within the scope of the invention. For example, the method embodiments described herein describes the method through method steps being performed in a certain order. However, it is recognized that these sequences of events may take place in another order without departing from the scope of the invention. Furthermore, it should be noted that throughout the description of embodiments of the invention, the partition of functional blocks into particular units is by no means limiting to the invention. Contrarily, these partitions are merely examples. Blocks described herein as one unit may be split into two or more units. In the same manner, functional blocks that are described herein as being implemented as two or more units may be implemented as a single unit without departing from the scope of the invention. Hence, it should be understood that the limitations of the described embodiments are merely for illustrative purpose and by no means limiting. Instead, the invention is construed to be limited by the appended claims and all reasonable equivalents thereof.

The invention claimed is:

1. A method of operating a data-processing unit to produce a transform expressible through a butterfly diagram, the method comprising:
   reading a first input data value from a first location of a first buffer, the first location being determined by a first read address based on a first read index;
   reading a second input data value from a second location of the first buffer, the second location being determined by a second read address based on a second read index;
   calculating first and second output data values from a first butterfly calculation based on at least the first and second input data values, each of the first and second output data values having a word length W;
   writing the first and second output data values to a second buffer, wherein the second buffer includes a single-port memory, a memory cell of the second buffer includes two adjacent memory locations and is twice as wide as the word length W, the second buffer includes a selector configured to select one of the two adjacent memory locations of the memory cell, the first and second output data values are concatenated, and the concatenated data values are written as a value having a word length 2 W to adjacent memory locations of the second buffer during a single write cycle, and the adjacent memory locations are determined by a first write address;
   reading a third input data value from a first location of the second buffer, the first location being determined by a third read address based on the first read index;
   and reading a fourth input data value from a second location of the second buffer, the second location being determined by a fourth address based on the second read index;
   the third read address is determined by swapping at least two bits of the first read index, and the fourth read address is determined by swapping at least two bits of the second read index.

2. The method of claim 1, wherein calculating the first and second output data values is based on at least one twiddle factor.

3. The method of claim 2, further comprising reading the at least one twiddle factor from a location of a third buffer.

4. The method of claim 1, wherein the transform is a size-N transform; and reading the first and second input data values, calculating the first and second output data values, and writing the first and second output data values are performed N/2 times during a first stage of the transform.

5. The method of claim 4, further comprising calculating third and fourth output data values from a second butterfly calculation based on at least the third and fourth input data values, each of the third and fourth output data values having the word length W; and writing the third and fourth output data values to the first buffer during a single write cycle; wherein the first buffer includes a single-port memory, a memory cell of the first buffer includes two adjacent memory locations and is twice as wide as the word length W, the first buffer includes a selector configured to select one of the two adjacent memory locations of the memory cell, the third and fourth output data values are concatenated, and the concatenated third and fourth data values are written as a value having a word length 2 W to adjacent memory locations of the first buffer during a single write cycle, and the adjacent memory locations are determined by a second write address.

6. The method of claim 5, wherein the transform is a size-N transform; and reading the third and fourth input data values, calculating the third and fourth output data values, and writing the third and fourth output data values are performed N/2 times during a second stage of the transform.

7. The method of claim 5, wherein reading two input data values, calculating two output data values, and writing two output data values are performed N/2 times during each stage of the transform.

8. The method of claim 1, wherein the first read address is determined by reversing a bit order of the first read index and the second read address is determined by reversing a bit order of the second read index.

9. The method of claim 1, wherein the transform is a fast Fourier transform.

10. The method of claim 1, wherein the first and second read indices comprise address values of at least one of the first and second data buffers.

11. A data-processing unit for producing a transform expressible through a butterfly diagram, comprising:
circuitry adapted to read a first input data value from a first location of a first buffer for storing data values, the first location being determined by a first read address based on a first read index;
to read a second input data value from a second location of the first buffer, the second location being determined by a second read address based on a second read index;
to calculate first and second output data values from a first butterfly calculation based on at least the first and second input data values, each of the first and second output data values having a word length W;
to write the first and second output data values to a second buffer for storing data values, wherein the second buffer includes a single-port memory, a memory cell of the second buffer includes two adjacent memory locations and is twice as wide as the word length W, the second buffer includes a selector configured to select one of the two adjacent memory locations of the memory cell, the circuitry is adapted to concatenate the first and second output data values and to write the concatenated first and second output data values as a value having a word length 2 W to adjacent memory locations of the second buffer during a single write cycle, the adjacent locations being determined by a first write address;
to read a third input data value from a third location of the second buffer, the third location being determined by a third read address based on the first read index; and to read a fourth input data value from a fourth location of the second buffer, the fourth location being determined by a fourth address based on the second read index; and
an address generator adapted to determine the third read address by swapping two bits of the first read index, and to determine the fourth read address by swapping two bits of the second read index.

12. The data-processing unit of claim 11, wherein the circuitry is further adapted to calculate the first and second output data values based on at least one twiddle factor.

13. The data-processing unit of claim 12 wherein the circuitry is further adapted to read the at least one twiddle factor from a location of a third buffer for storing twiddle factors.

14. The data-processing unit of claim 11, wherein the transform is a size-N transform; and the circuitry is adapted to read the first and second input data values, calculate the first and second output data values, and write the first and second output data values N/2 times during a first stage of the transform.

15. The data-processing unit of claim 11, wherein the circuitry is further adapted to calculate third and fourth output data values from a second butterfly calculation based on at least the third and fourth input data values, each of the third and fourth output data values having the word length W, and to write the third and fourth output data values to the first buffer during a single write cycle; the first buffer includes a single-port memory, a memory cell of the first buffer includes two adjacent memory locations and is twice as wide as the word length W, the first buffer includes a selector configured to select one of the two adjacent memory locations of the memory cell, the third and fourth output data values are concatenated, and the concatenated third and fourth data values are written as a value having a word length 2 W to adjacent memory locations of the first buffer during a single write cycle, and the adjacent memory locations are determined by a second write address.

16. The data-processing unit of claim 15, wherein the transform is a size-N transform; and the circuitry is adapted to read the third and fourth input data values, calculate the third and fourth output data values, and write the third and fourth output data values N/2 times during a second stage of the transform.

17. The data-processing unit of claim 16, wherein the circuitry is adapted to read two input data values, calculate two output data values, and write the two output data values to adjacent memory locations of a buffer during a single write cycle N/2 times during each stage of the transform.

18. The data-processing unit of claim 11, further comprising at least one register unit adapted to temporarily store at least one of the first input data value, the second input data value, the first output data value, the second output data value, and intermediate results of calculation of the first and second output data values.

19. The data-processing unit of claim 11, wherein the address generator comprises an input port adapted to receive a control signal, and the address generator is adapted to swap at least two bits of the first read index and at least two bits of the second read index based on the control signal.

20. The data-processing unit of claim 11, wherein the address generator is adapted to determine the first read address by reversing a bit order of the first read index and to determine the second read address by reversing a bit order of the second read index.

21. The data-processing unit of claim 11, wherein the transform is a fast Fourier transform.

22. The data-processing unit of claim 11, wherein the first and second read indices comprise address values of at least one of the first and second data buffers.

23. The data-processing unit of claim 11, wherein the data-processing unit is included in a transform-computation unit.

24. The data-processing unit of claim 11, wherein the data processing unit is included in an electronic apparatus, and the electronic apparatus is a portable or handheld mobile radio communication equipment, a mobile radio terminal, a mobile telephone, a pager, a communicator, an electronic organizer, a smartphone, a computer, an embedded drive, a mobile gaming device, a watch, a base station, or a base station controller.

25. The data-processing unit of claim 24, wherein the electronic apparatus is compliant with a Universal Mobile Telecommunications System Long Term Evolution standard.

* * * * *